(12) United States Patent
Cowart et al.

(10) Patent No.: US 11,914,232 B2
(45) Date of Patent: Feb. 27, 2024

(54) EYE SHIELDS WITH SELECTIVELY RELEASABLE SNAP-FIT ASSEMBLY

(71) Applicant: DeRoyal Industries, Inc., Powell, TN (US)

(72) Inventors: Walter C. Cowart, Blaine, TN (US); Ethan Edward Valentine, Knoxville, TN (US)

(73) Assignee: DeRoyal Industries, Inc., Powell, TN (US)

( * ) Notice: Subject to any disclaimer, the term of this patent is extended or adjusted under 35 U.S.C. 154(b) by 262 days.

(21) Appl. No.: 17/218,610

(22) Filed: Mar. 31, 2021

(65) Prior Publication Data
US 2022/0113560 A1   Apr. 14, 2022

Related U.S. Application Data

(60) Provisional application No. 63/109,034, filed on Nov. 3, 2020, provisional application No. 63/089,897, filed on Oct. 9, 2020.

(51) Int. Cl.
*G02C 7/16* (2006.01)
*G02C 9/04* (2006.01)

(52) U.S. Cl.
CPC .............. *G02C 7/16* (2013.01); *G02C 9/04* (2013.01)

(58) Field of Classification Search
CPC ... G02C 7/00; G02C 7/16; G02C 9/04; G02C 2200/08; G02C 5/20; G02C 5/146;
(Continued)

(56) References Cited

U.S. PATENT DOCUMENTS

| 653,086 A | 7/1900 | Houts |
| 1,380,561 A | 6/1921 | Kaufmann |

(Continued)

FOREIGN PATENT DOCUMENTS

| GB | 1210962 A | 11/1970 |
| GB | 2442755 A | 4/2008 |

OTHER PUBLICATIONS

International Searching Authority, Kari Rodriquez, Notification of Transmittal of the International Search Report and the Written Opinion of the International Searching Authority, or the Declaration, dated Jan. 11, 2022.

*Primary Examiner* — Marin Pichler
*Assistant Examiner* — Justin W. Hustoft
(74) *Attorney, Agent, or Firm* — Luedeka Neely, P.C.

(57) ABSTRACT

An eye shield includes a frame having a plurality of receivers located along the frame and a plurality of latches located to cooperate with the receivers, and a lens having a plurality of spaced apart lens apertures extending through the lens and located so as to align with the receivers of the frame when the lens is positioned for installation onto the frame. The latches are engageable with the receivers by rotating the latches to pass an elongate catch of the latch into the receiver through the aligned lens aperture and an open front of the receiver to latchingly engage a tooth of the latch with a catch surface of the receiver in a snap-fit frictional relationship. The latches are also selectively disengageable from the receivers by applying force to a lower edge of the latch and flexing the lower edge of the latch rearward slightly to disengage the tooth from the catch surface.

6 Claims, 8 Drawing Sheets

(58) Field of Classification Search
CPC ...... G02C 5/2272; G02C 5/006; G02C 5/124;
G02C 13/00; G02C 13/001; G02B
2027/0178
See application file for complete search history.

(56) References Cited

U.S. PATENT DOCUMENTS

| | | | |
|---|---|---|---|
| 1,860,324 A | 5/1932 | Einson | |
| 2,006,445 A | 7/1935 | Davidson | |
| 2,030,996 A | 2/1936 | Lustig | |
| 2,031,575 A | 2/1936 | Roe | |
| 2,137,906 A | 11/1938 | Cummings | |
| 2,517,030 A | 8/1950 | Ringler | |
| 2,555,578 A | 6/1951 | Davis | |
| 2,903,700 A | 9/1959 | Finken et al. | |
| 3,233,249 A | 2/1966 | Baratelli et al. | |
| 3,368,221 A | 2/1968 | Anderson | |
| 4,523,819 A | 6/1985 | Dianitsch et al. | |
| 4,759,622 A | 7/1988 | Schmidthaler | |
| 4,822,158 A | 4/1989 | Porsche | |
| 5,375,702 A | 12/1994 | Fiallo | |
| 6,481,845 B1 | 11/2002 | Gazzara | |
| 6,533,412 B1 | 3/2003 | Wang et al. | |
| 6,564,804 B2 | 5/2003 | Salatka et al. | |
| 6,964,067 B1 | 11/2005 | Hartman | |
| 6,990,981 B2 | 1/2006 | DuBois et al. | |
| 7,624,890 B2 * | 12/2009 | Noble | B65D 83/0445 206/538 |
| 7,661,815 B2 | 2/2010 | Lipawsky | |
| 8,214,921 B2 | 7/2012 | Grad et al. | |
| 8,458,813 B2 | 6/2013 | Grad et al. | |
| 8,668,330 B2 | 3/2014 | Reyes et al. | |
| 8,707,462 B2 | 4/2014 | Grad et al. | |
| 8,992,007 B2 | 3/2015 | Li | |
| 10,239,683 B2 | 3/2019 | Umentum et al. | |
| 10,274,748 B2 | 4/2019 | Calilung et al. | |
| 10,359,642 B2 | 7/2019 | Calilung et al. | |
| 10,423,008 B2 | 9/2019 | Froissard | |
| 10,517,763 B2 | 12/2019 | Quinn et al. | |
| 10,543,955 B1 | 1/2020 | Turturro et al. | |
| 10,702,345 B2 | 7/2020 | Saito et al. | |
| 10,702,417 B2 | 7/2020 | Chen | |
| 11,369,155 B2 | 6/2022 | Tang | |
| 2008/0087556 A1 | 4/2008 | Henke et al. | |
| 2009/0188015 A1 | 7/2009 | Grad et al. | |
| 2009/0314661 A1 | 12/2009 | Fisher et al. | |
| 2016/0299359 A1 | 10/2016 | Ogawa et al. | |
| 2017/0239089 A1 * | 8/2017 | Quinn | A61F 9/025 |
| 2018/0228652 A1 | 8/2018 | Ohura | |
| 2019/0218018 A1 | 7/2019 | Umentum et al. | |

* cited by examiner

EYE SHIELDS WITH SELECTIVELY RELEASABLE SNAP-FIT ASSEMBLY

FIELD

The present disclosure relates to eye shields. More particularly, the disclosure relates to improved molded eye shield structures having an improved selectively releasable snap-fit latch that provides improved function for ease of assembly and disassembly, and improved aesthetics.

BACKGROUND

Improvement is desired in the manufacture of disposable eye shields of the type having a molded plastic frame with ear pieces and a lens that is secured to the frame to provide an eye shield.

The present disclosure advantageously provides eye shields having a molded plastic frame configured to enable a lens to be easily attached securely to the frame and to also be easily removed from the frame when desired. For example, the frame enables the lens to be easily attached and also to be easily removed for cleaning or replacement.

SUMMARY

The above and other needs are met by an improved eye shield.

In one aspect, an eye shield according to the disclosure includes a frame having a plurality of receivers located along the frame and a plurality of latches located to cooperate with the receivers. The eye shield also includes a lens having a plurality of spaced apart lens apertures extending through the lens and located so as to align with the receivers of the frame when the lens is positioned for installation onto the frame.

Each of the receivers includes an elongate cavity having an open front with a sloped entrance wall extending upwardly from the open front at an angle, and a catch wall located behind the sloped entrance wall, the catch wall defining a catch surface.

Each of the latches includes a flap hingedly connected to the frame, and a flex area formed on the flap configured to impart flexion to the flap when pressure is applied to a lower edge of the flap, the flex area preferably provided by a void area, an elongate catch extending upwardly at an angle from an inner surface of the flap corresponding substantially to the angle of the sloped entrance wall, and a tooth projecting from a distal end of the elongate catch and configured to engaging the catch surface of the catch wall.

The latch is engageable with the receiver by rotating the latch to pass the elongate catch into the receiver through the aligned lens aperture and the open front of the receiver to latchingly engage the tooth with the catch surface of the receiver in a snap-fit frictional relationship.

The latch is also selectively disengageable from the receiver by applying force to a lower edge of the flap and flexing the lower edge of the flap rearward slightly to disengage the tooth from the catch surface.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
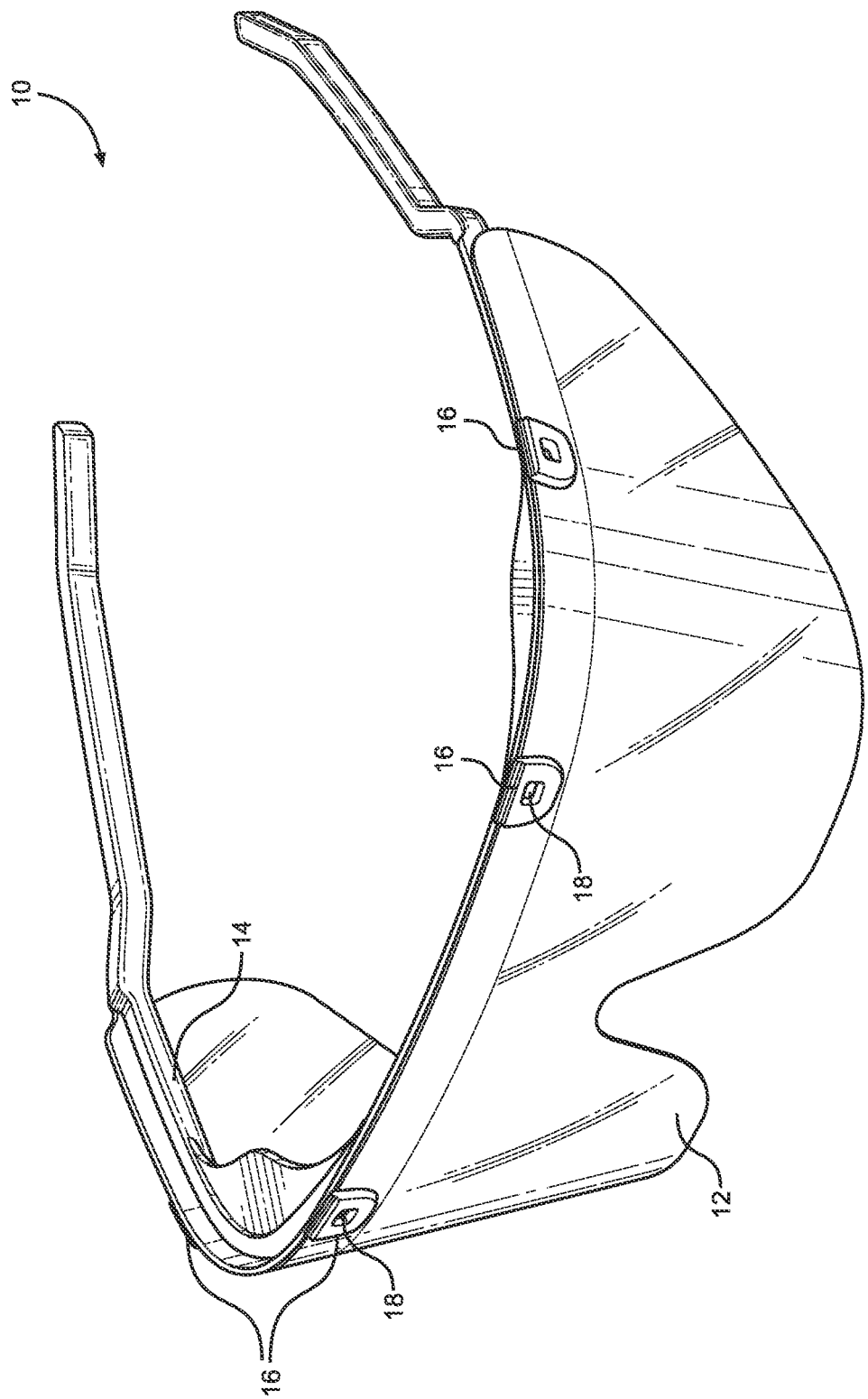
FIG. 1 is a perspective view of an eye shield according to the disclosure.
Figure 2:
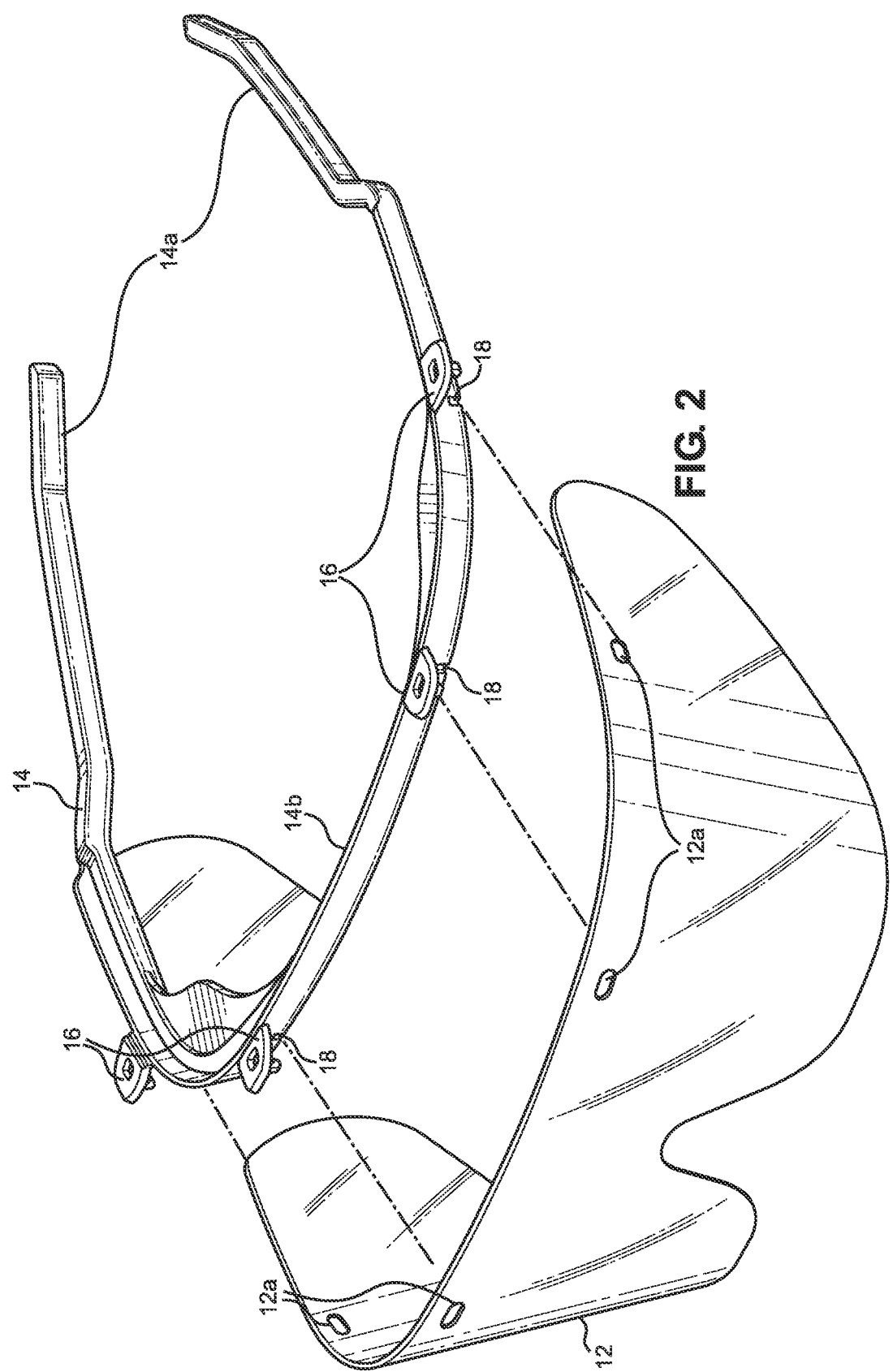
FIG. 2 is an exploded view thereof.

With reference to the drawings, the disclosure provides in an eye shield 10 having a lens 12 attached in a releasable snap-fit relationship to a frame 14 by a hinged latch 16. The appearance of the device 10 is also configured to be aesthetically pleasing and includes various ornamental aspects and features.

Figure 3:
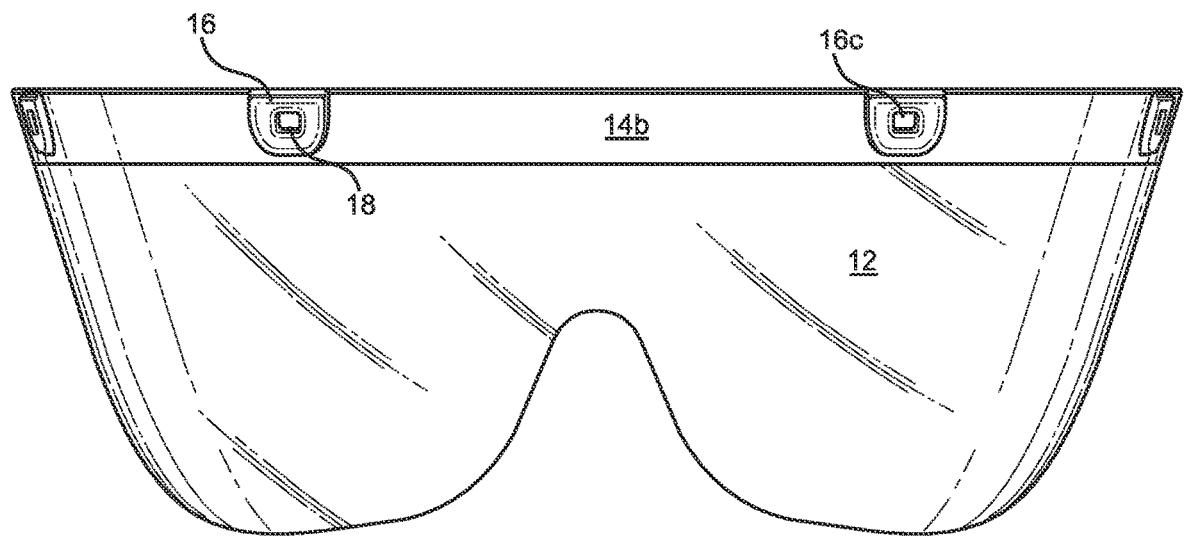
FIG. 3 is a frontal view thereof.
Figure 4:
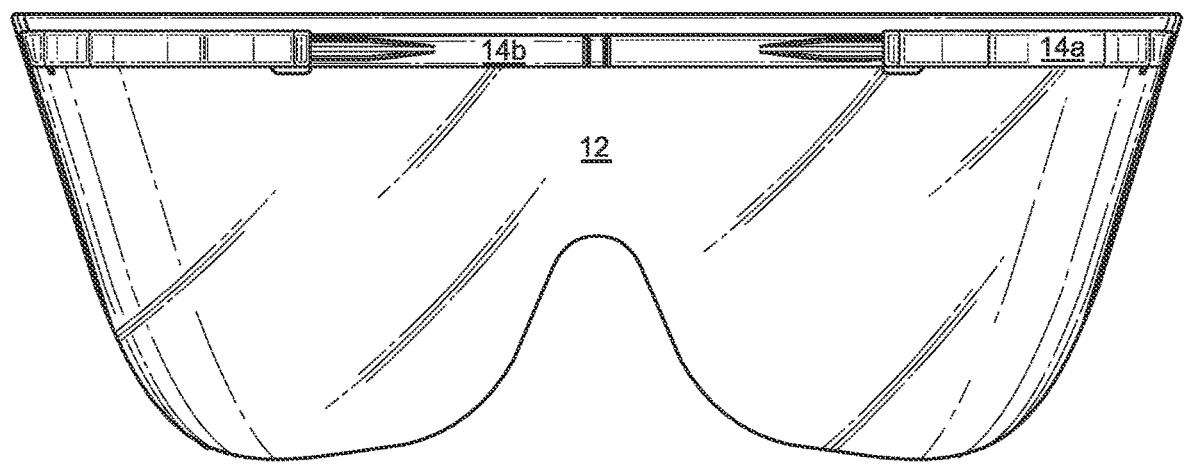
FIG. 4 is a rear view thereof.
Figure 5:
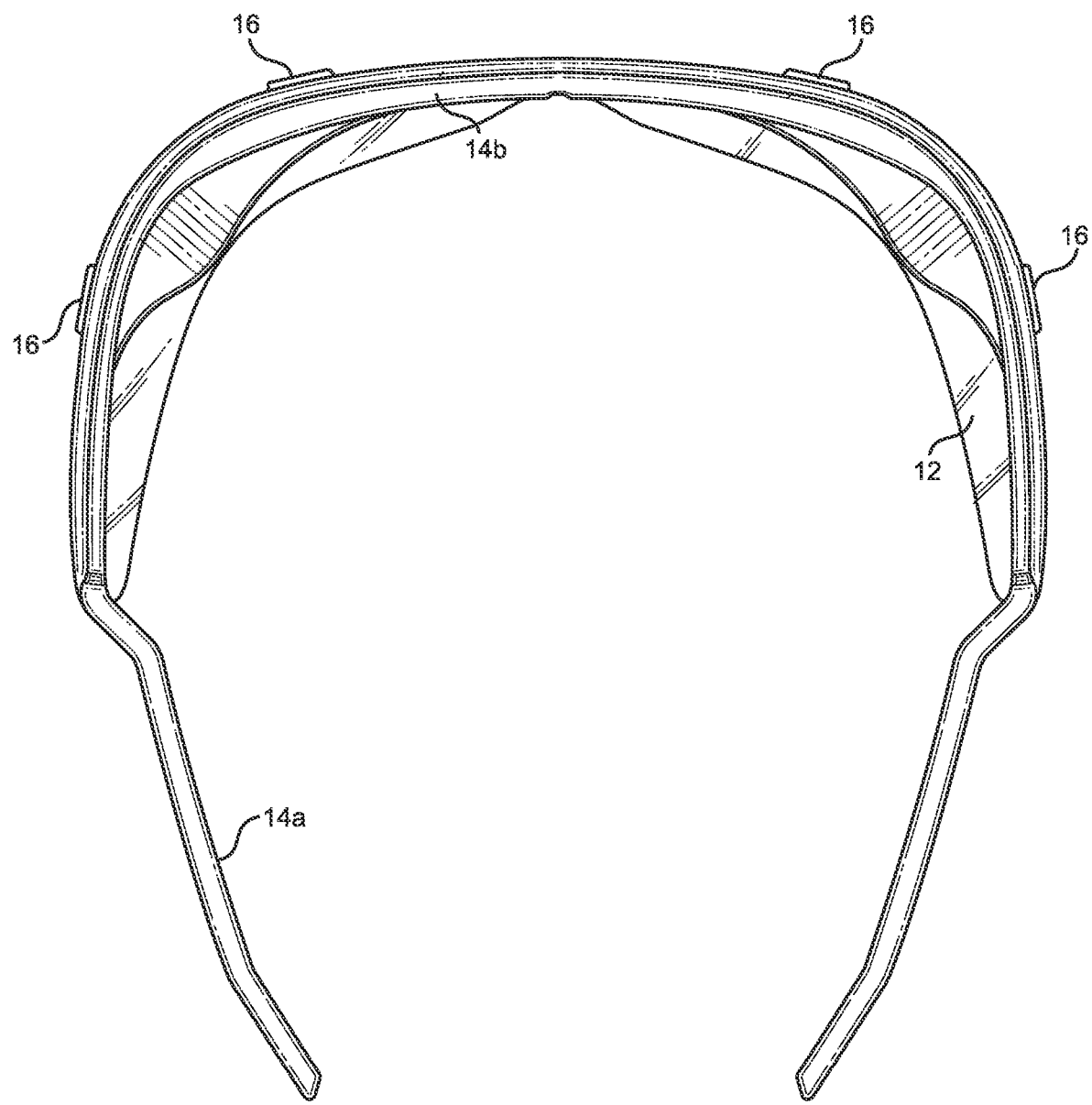
FIG. 5 is a top view thereof.
Figure 6:
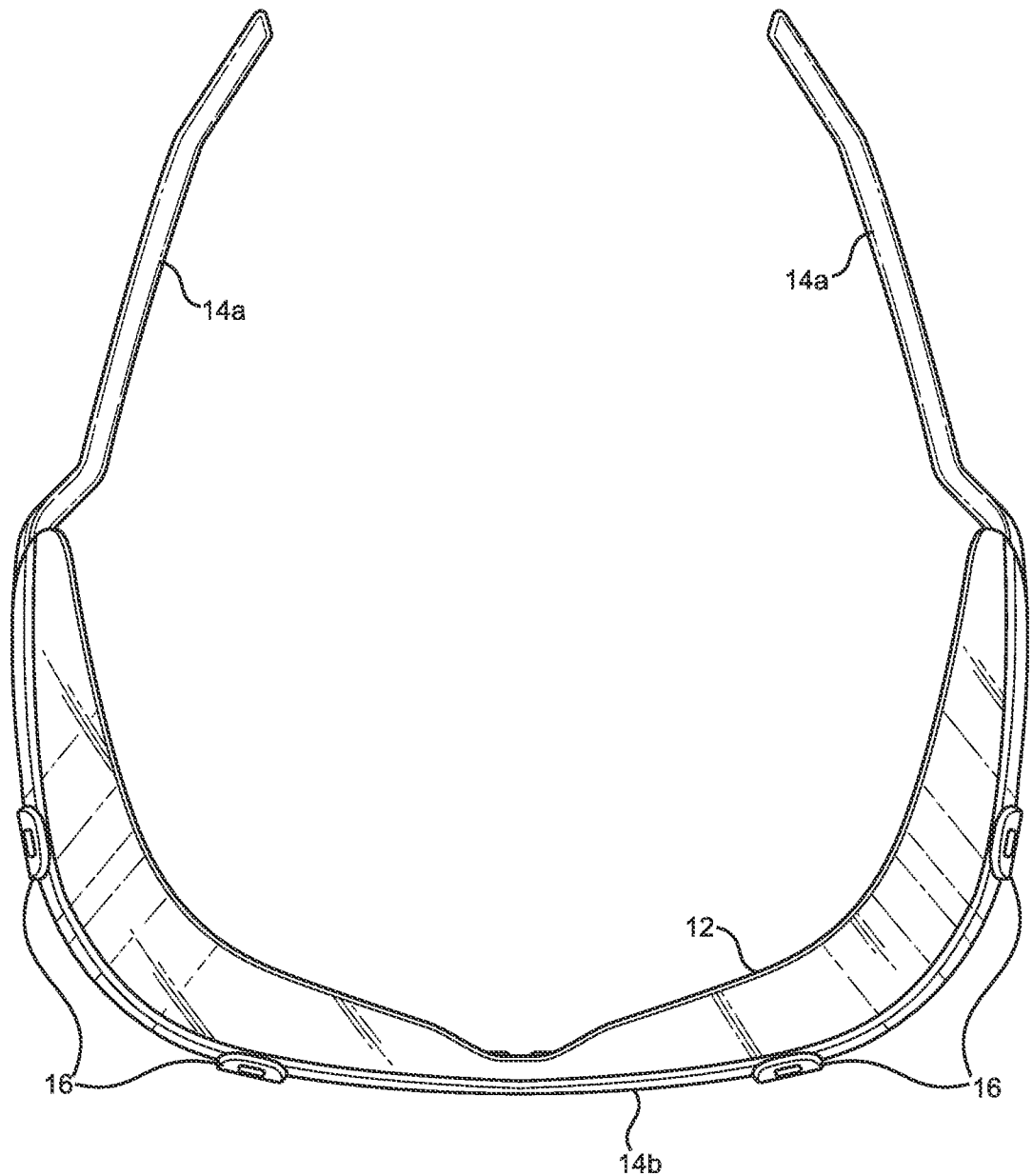
FIG. 6 is a bottom view thereof.
Figure 7:
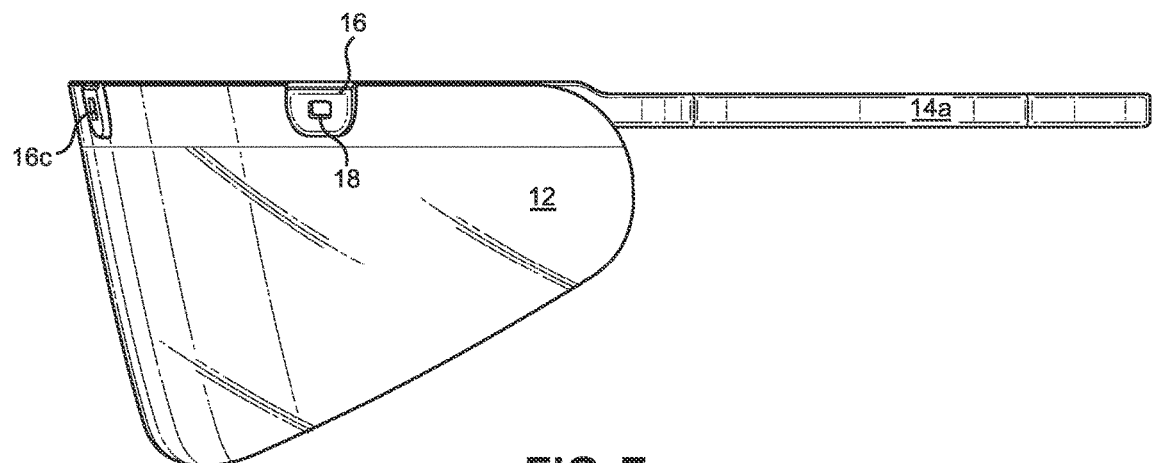
FIG. 7 is a left side view thereof.
Figure 8:
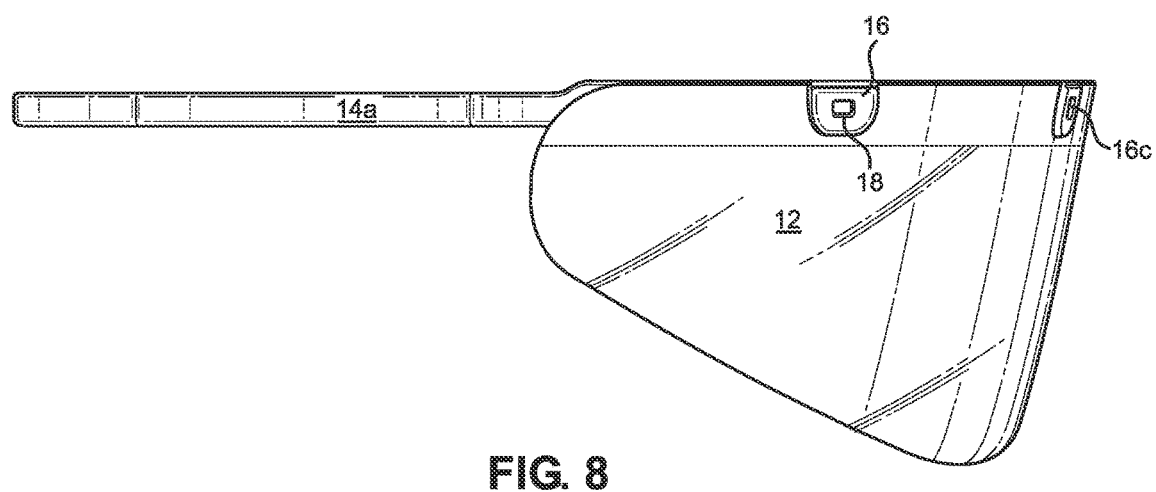
FIG. 8 is a right side view thereof.
Figure 9:
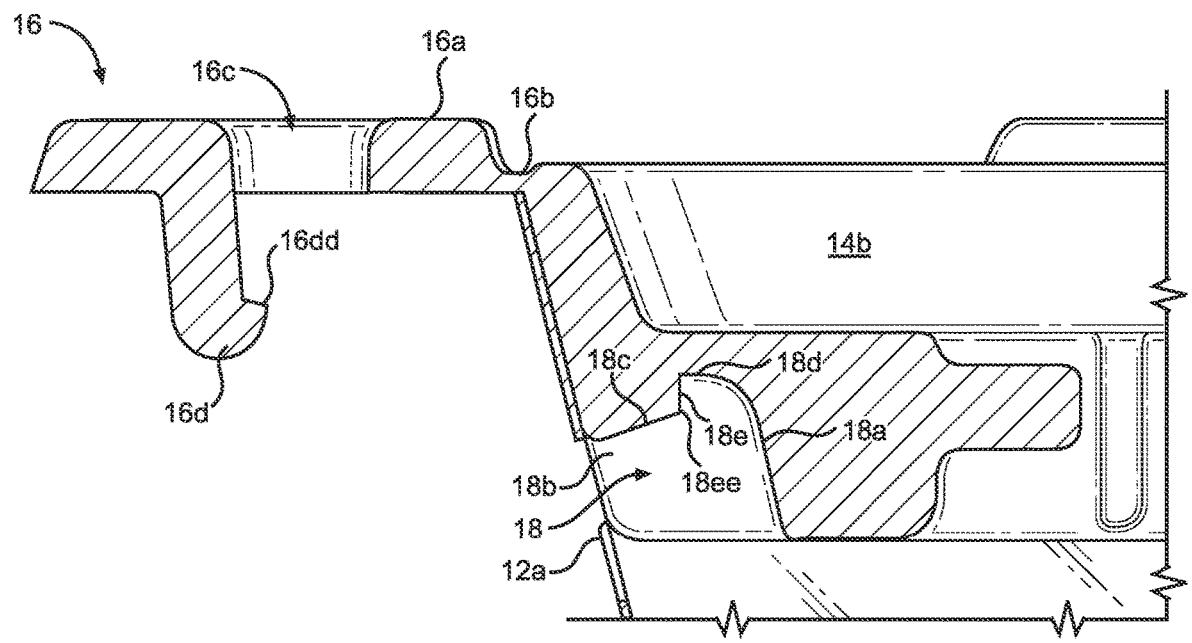
FIGS. 9 and 10 are cross-sectional views of the latch structures of the eye shield.
Figure 10:
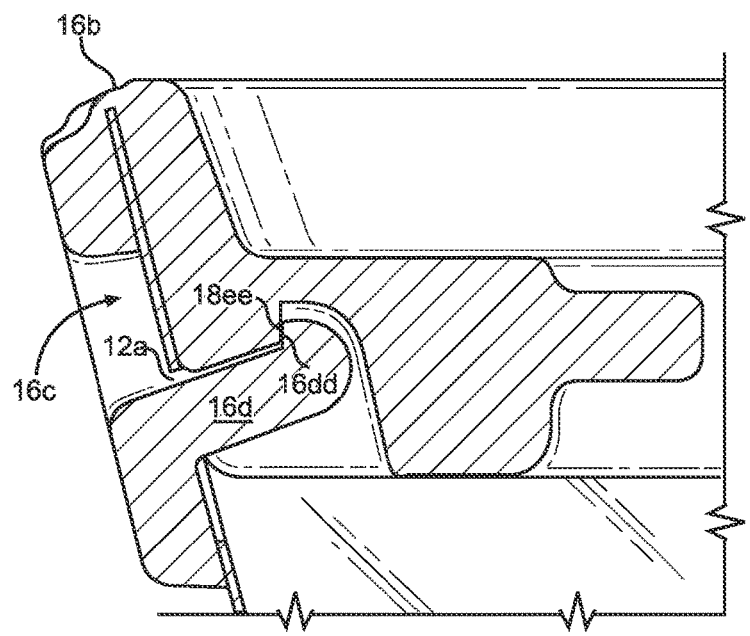
Figure 11:
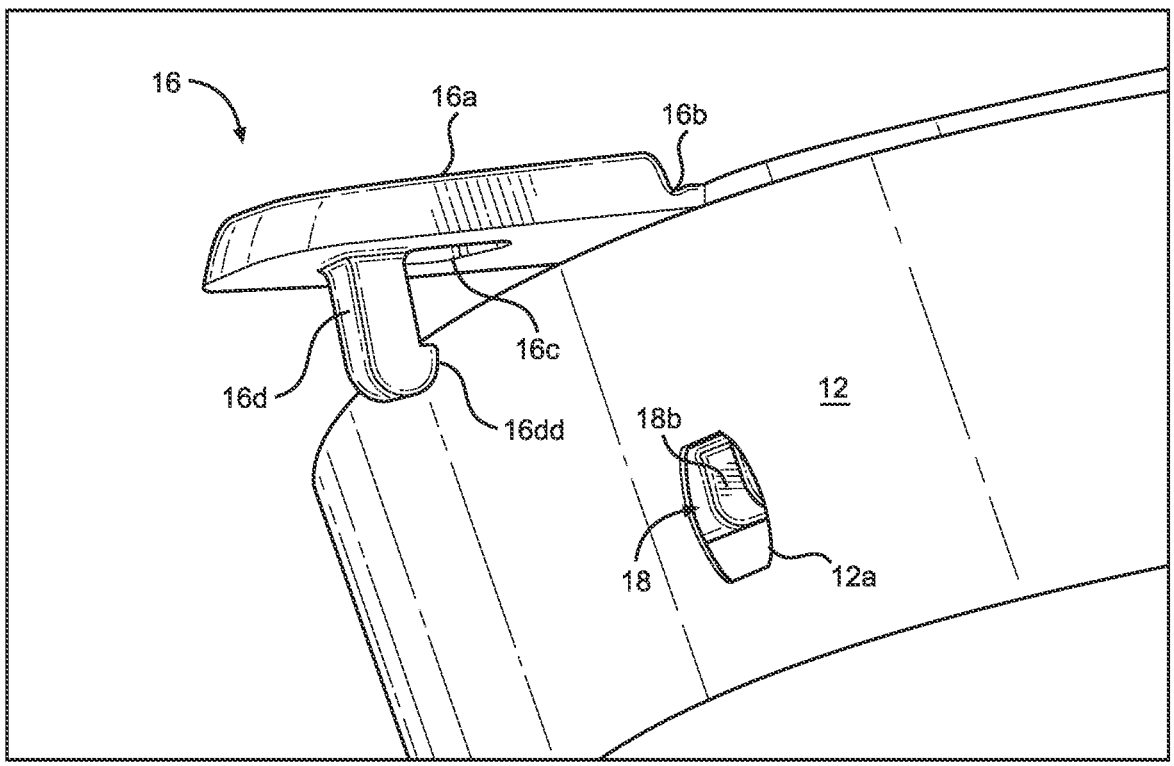
FIGS. 11 and 12 are close-up exterior views of the latch structures in unlatched and latched positions.
Figure 12:
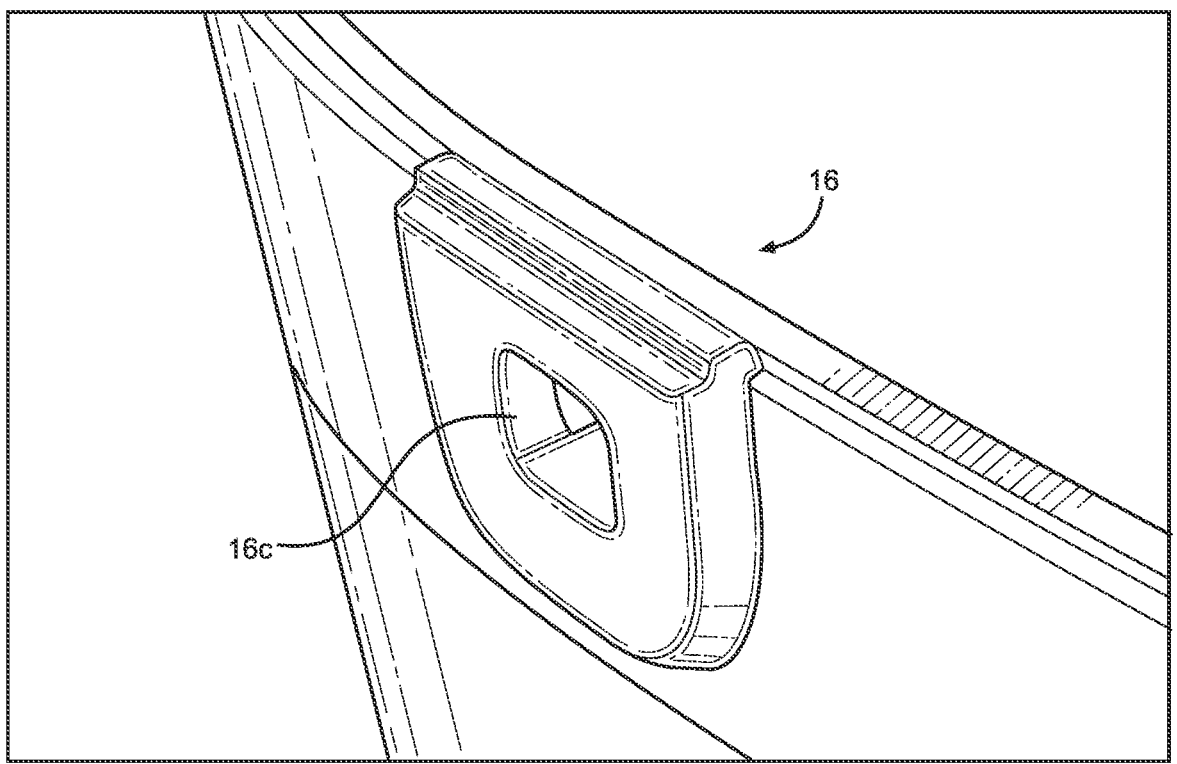

The lens 12 is preferably a one-piece plastic lens die cut from flat plastic film or other suitable lens material. As shown in FIG. 3, the lens 12 includes a plurality of spaced apart lens apertures 12a defined adjacent an upper edge of the lens 12. The lens 12 may be configured in various configurations. As shown, the lens 12 is curved so as to curve around the sides of the frame 14.

The frame 14 is preferably of molded plastic construction and has ear pieces 14a and a curved brow piece 14b. The brow piece 14b includes receivers 18 formed thereon configured to cooperate with the lens apertures 12a and the latch 16, as described more fully below.

The hinged latch 16 is specially configured to cooperate with the receivers 18 and hold the lens 12 in place on the frame 14. The hinged latch 16 is also configured to be easily unlatched from the receiver 18 for removal of the lens 12, and re-latched for replacement of the lens 12 if desired. The hinged latch 16 is preferably of unitary plastic construction co-formed with the frame 14.

With additional reference to FIGS. 9-12, the hinged latches 16 include a flap 16a hingedly attached to an upper edge of the brow piece 14b as by a hinge 16b, which is preferably a living hinge. The flap 16a is desirably a thin, flat member configured to provide a continuous flat surface, except for a central void area or window 16c formed on the flap 16a. The window 16c provides desired aesthetics to the appearance of the hinged latch 16, and also enables desirable flexion to the flap 16a when force is applied to facilitate disengagement of the hinged latch 16 from the receiver 18. An elongate catch 16d is located to extend from an inner surface of the flap 16a and located below the window 16c and configured to extend at an upward angle into the receiver 18 to engage with the receiver 18 in a snap-fit relationship when the flap 16a is closed. The catch 16d includes a projecting tooth 16dd located and configured to engage the receiver 18.

The receivers 18 are spaced and located to correspond to the locations of the lens apertures 12a. The receivers 18 define an elongate cavity and are formed along a lower frontal edge of the curved brow piece 14b. As seen in FIGS. 9-12, the receivers 18 are open at the bottom and the front with a rear wall 18a, opposite side walls 18b, sloped entrance wall 18c, and rear ceiling 18d. A catch wall 18e is located between the entrance wall 18c and the rear ceiling 18d and is preferably substantially vertical. A lower portion of the catch wall 18e provides a catch surface 18ee for cooperating with the latch 16.

During assembly of the eye shield 10, the lens 12 is located so that the apertures 12a of the lens 12 overlie the receivers 18 of the brow piece 14. The hinged latches 16 are likewise located to engage the receivers 18. To engage the latch 16 with the receiver 18, the flap 16a is rotated so as to pass the catch 16d into the receiver 18 through the aligned lens aperture 12a and opening of the receiver 18 located between the side walls 18b of the receiver 18. As will be noted, the catch 16d is inclined to match the slope of the sloped entrance wall 18c, which angle is preferably from about 20 to about 40 degrees. The catch 16d has a length configured so that when the flap 16a is flush with the lens 12 the tooth 16dd snugly engages the catch surface 18ee in a snap-fit frictional relationship and remains engaged with the catch surface 18ee unless force is applied as described herein to disengage the tooth 16dd from the catch surface 18ee If it is desired to disengage the latch 16 from the receiver 18 so as to be able to remove the lens 12 from the frame 14, a lower edge of the flap 16a may be grasped, as by a fingernail or the like, and the lower edge of the flap 16a flexed rearward slightly to disengage the tooth 16dd from the catch surface 18ee. In this regard the window 16c of the flap 16a enables desirable flexion to the flap 16a when force is applied to facilitate disengagement of the hinged latch 16 from the receiver 18. The flexion provided by the window 16c avoids permanent bending or the flap 16a.

The sloped configuration of the catch 16d and the entrance wall 18c of the receiver 18 and the configurations of the tooth 16dd and the catch surface 18ee also cooperate such that only a very small amount of flexion of the flap 16a is needed to disengage the latch 16 from the receiver 18, yet the latch 16 otherwise remains snugly engaged in the receiver 18. Synergistic with this is the configuration of the catch 16d below the window 16c such that focused force is applied to a lower edge of the flap 16a and the flap 16a is not permanently deformed such that the flap 16a returns to its original flat shape to enable the latch 16 to be repeatably engageable and disengageable with the receiver 18.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated.

The invention claimed is:

1. An eye shield, comprising
a frame having a plurality of receivers located along the frame and a plurality of latches located to cooperate with the receivers,
each of the receivers comprising an elongate cavity having an open front with a sloped entrance wall extending upwardly from the open front at an angle, and a catch wall located behind the sloped entrance wall, the catch wall defining a catch surface,
each of the latches comprising a flap hingedly connected to the frame, and a void area formed on the flap as a window to extend though the flap and configured to impart flexion to the flap when pressure is applied to a lower edge of the flap, an elongate catch extending upwardly at an angle from an inner surface of the flap corresponding substantially to the angle of the sloped entrance wall, and a tooth projecting from a distal end of the elongate catch and configured to engaging the catch surface of the catch wall; and
a lens having a plurality of spaced apart lens apertures extending through the lens and located so as to align with the receivers of the frame when the lens is positioned for installation onto the frame;
wherein, the latch is engageable with the receiver by rotating the latch to pass the elongate catch into the receiver through the aligned lens aperture and the open front of the receiver to latchingly engage the tooth with the catch surface of the receiver in a snap-fit frictional relationship, and
wherein the latch is selectively disengageable from the receiver by applying force to a lower edge of the flap and flexing the lower edge of the flap rearward slightly to disengage the tooth from the catch surface.

2. The eye shield of claim 1, wherein the sloped entrance wall extends upwardly from the open front at an angle of from about 20 degrees to about 40 degrees.

3. The eye shield of claim 1, wherein the frame is of molded plastic construction and the receivers and the latches are co-formed with the frame.

4. The eye shield of claim 1, wherein the latch is repeatably engageable and disengageable with the receiver.

5. The eye shield of claim 1, wherein a bottom of the receiver is open.

6. An eye shield, comprising
a frame having a plurality of receivers located along the frame and a plurality of latches located to cooperate with the receivers,
each of the receivers comprising an elongate cavity having an open front with a sloped entrance wall extending upwardly from the open front at an angle, and a catch wall located behind the sloped entrance wall, the catch wall defining a catch surface,
each of the latches comprising a flap hingedly connected to the frame, and a window formed on and extending though the flap and configured to impart flexion to the flap when pressure is applied to a lower edge of the flap, an elongate catch extending upwardly at an angle from an inner surface of the flap corresponding substantially to the angle of the sloped entrance wall, and a tooth projecting from a distal end of the elongate catch and configured to engaging the catch surface of the catch wall; and
a lens having a plurality of spaced apart lens apertures extending through the lens and located so as to align with the receivers of the frame when the lens is positioned for installation onto the frame;
wherein, the latch is engageable with the receiver by rotating the latch to pass the elongate catch into the receiver through the aligned lens aperture and the open front of the receiver to latchingly engage the tooth with the catch surface of the receiver in a snap-fit frictional relationship, and
wherein the latch is selectively disengageable from the receiver by applying force to a lower edge of the flap and flexing the lower edge of the flap rearward slightly to disengage the tooth from the catch surface.

\* \* \* \* \*